United States Patent [19]

Ohmae et al.

[11] Patent Number: 5,098,953
[45] Date of Patent: Mar. 24, 1992

[54] METHOD FOR PRODUCING THERMOPLASTIC RESIN COMPOSITIONS

[75] Inventors: Tadayuki Ohmae; Yoshiki Toyoshima; Kentaro Mashita; Jinsho Nambu, all of Chiba, Japan

[73] Assignee: Sumitomo Chemical Co. Ltd., Osaka, Japan

[21] Appl. No.: 647,200

[22] Filed: Jan. 28, 1991

Related U.S. Application Data

[60] Continuation of Ser. No. 385,319, Jul. 27, 1989, abandoned, which is a division of Ser. No. 157,262, Feb. 18, 1988, abandoned.

[30] Foreign Application Priority Data

Mar. 31, 1987 [JP] Japan ............................. 62-80786

[51] Int. Cl.⁵ .................................................. C08L 67/02
[52] U.S. Cl. ..................................... 525/176; 525/64; 525/166
[58] Field of Search ........................................ 525/176

[56] References Cited

U.S. PATENT DOCUMENTS

| | | | |
|---|---|---|---|
| 3,959,215 | 5/1976 | Schneider | 524/95 |
| 4,172,859 | 10/1979 | Epstein | 525/109 |
| 4,956,501 | 9/1990 | Sunseri | 525/64 |

FOREIGN PATENT DOCUMENTS

| | | |
|---|---|---|
| 177151 | 4/1986 | European Pat. Off. |
| 197260 | 10/1986 | European Pat. Off. |
| 1814073 | 12/1968 | Fed. Rep. of Germany |
| 55-137154 | 10/1980 | Japan |
| 56-159247 | 11/1981 | Japan |
| 57-137348 | 8/1982 | Japan |
| 58-47419 | 10/1983 | Japan |
| 59-4618 | 1/1984 | Japan |
| 61-42561 | 3/1986 | Japan |
| 61-200159 | 9/1986 | Japan |
| 61-204258 | 9/1986 | Japan |
| 61-221260 | 10/1986 | Japan |
| 8503718 | 8/1985 | PCT Int'l Appl. |
| 1208585 | 10/1970 | United Kingdom |

Primary Examiner—Patricia Short
Attorney, Agent, or Firm—Cushman, Darby & Cushman

[57] ABSTRACT

Disclosed is a method for producing a thermoplastic resin composition which can be easily molded into articles having good balance in properties and good appearance. Said method comprises melt-kneading (A) 60-97 parts by weight of a saturated polyester resin and (B) 40-3 parts by weight of an epoxy group-containing ethylene copolymer and then melt-kneading the resulting composition with (C) 0.01-20 parts by weight of a polyfunctional compound containing in one molecule at least two functional groups having reactivity with epoxy group, carboxyl group or hydroxyl group to carry out partial crosslinking reaction.

1 Claim, No Drawings

METHOD FOR PRODUCING THERMOPLASTIC RESIN COMPOSITIONS

This is a continuation of application Ser. No. 07/385,319, filed on July 27, 1989, which was abandoned upon the filing hereof, which in turn is a divisional of application Ser. No. 07/157,262 filed Feb. 18,1988, now abandoned.

BACKGROUND OF THE INVENTION

The present invention relates to a method for producing a novel thermoplastic resin composition which has improved mechanical properties, especially improved impact resistance and which can be utilized for making shaped articles, sheets or films by injection molding or extrusion molding.

Generally, saturated polyester resins are superior in weather resistance, electric characteristics, chemical resistance, wear resistance and thermal aging resistance and are widely used as engineering plastics. However, they have difficulties in impact resistance which hinder development for practical use thereof.

Hitherto, there have been proposed various methods for improving impact resistance of saturated polyester resins.

Representatives thereof are, for example, as follows: a method of adding ethylene copolymer containing an active group reactive with saturated polyester resin as well as having rubber elasticity; a method of melt mixing with an o-olefin-glycidyl methacrylate copolymer; and a method of adding a polyfunctional compound selected from the group consisting of epoxy compounds, isocyanate compounds and carboxylic acid anhydrides or a carboxylic acid to an olefinic copolymer comprising α-olefin and a glycidyl ester of α, β-unsaturated acid. These methods are disclosed, for example, in Japanese Patent Examined Publication (Kokoku) Nos. 28223/84 and 47419/83 and Japanese Patent Unexamined Publication (Kokai) Nos.137154/80 and 159247/81.

However, it has been found that these conventional methods can afford molded articles which are improved in impact resistance to some extent, but these are not satisfactory yet. The articles are not satisfactory in balance of stiffness and impact resistance, either.

That is, the somewhat improved impact resistance and flexibility are offset by the mechanical properties such as stiffness, tensile strength and hardness which are considerably inferior to those of saturated polyester per se.

Therefore, it is important to accomplish a method for making a composition free from the above problems by blending a ethylene copolymer with saturated polyester resins and the development therefor has been earnestly demanded.

SUMMARY OF THE INVENTION

The present invention is to solve the above problems, namely, to improve the impact resistance of saturated polyester resins without damaging mechanical properties such as heat resistance and stiffness by melt-mixing an ethylene copolymer of specific structure and a cross-linking polyfunctional compound with saturated polyesters by a specific blending method. Thus, the object of the present invention is to provide a method for producing a saturated polyester resin composition mainly composed of saturated polyester resin and excellent in impact resistance as well as other mechanical properties such as heat resistance and stiffness.

As a result of the inventors' extensive and intensive researches on the method for production of resin compositions which is effective for modification of saturated polyester resins, a method has been found which can afford a composition which is well balanced in impact resistance, heat resistance and stiffness and is excellent in processability and in appearance of molded articles.

DESCRIPTION OF THE INVENTION

That is, the present invention relates to a method for producing a thermoplastic resin composition, characterized by melt-mixing (A) 60-97 parts by weight of a saturated polyester resin with (B) 40-3 parts by weight of an epoxy group-containing ethylene copolymer and then further melt-mixing the resulting composition with (C) 0.01-20 parts by weight of a polyfunctional compound containing in one molecule at least 2 functional groups which have reactivity with epoxy group, carboxyl group and hydroxyl group, thereby to perform partial cross-linking reaction.

The saturated polyester resin used in the present invention is a linear saturated condensation product of a glycol with a dicarboxylic acid or a reactive derivative thereof as disclosed, for example, in Japanese Patent Examined Publication (Kokoku) No.28223/84.

As the glycol, mention may be made of, for example, aliphatic or alicyclic glycols such as ethylene glycol, 1,3-trimethylene glycol, 1,4-tetramethylene glycol, 1,6-hexamethylene glycol, 1,8-octamethylene glycol, 1,10-decamethylene glycol, 2,2-dimethyl-1,3-propanediol, neopentyl glycol and cyclohexane dimethanol. These may be used alone or as mixtures thereof.

As the dicarboxylic acid, mainly aromatic dicarboxylic acids such as terephthalic acid, isophthalic acid, bisbenzoic acid, naphthalenedicarboxylic acid, bis(p-carboxyphenyl)methane and ethylene-bis-p-benzoic acid are used. Besides, there may be used aliphatic dicarboxylic acids such as adipic acid, sebacic acid, azelaic acid and dodecanedicarboxylic acid or alicyclic dicarboxylic acids such as cyclohexanedicarboxylic acid. Mixtures of them may also be used.

Polyester resins suitable in the present invention include polyethylene terephthalate and poly(1,4-butylene)terephthalate.

The epoxy group-containing ethylene copolymer (B) which constitutes the resin composition of the present invention is a copolymer comprising unsaturated epoxy compound and ethylene.

The epoxy group-containing ethylene copolymer (B) has no special limitation in its composition, but desirably contains 0.1–50% by weight, preferably 1–20% by weight of unsaturated epoxy compound copolymerized.

As the unsaturated epoxy compound, there may be used a compound having in molecule an unsaturated group copolymerizable with ethylene and an epoxy group. Examples thereof are unsaturated glycidyl esters and unsaturated glycidyl ethers represented by the following formulas (1) and (2).

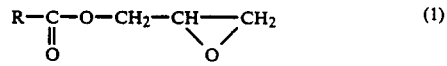 (1)

(wherein R is a hydrocarbon group of 2-18 carbon atoms which has an ethylenically unsaturated bond).

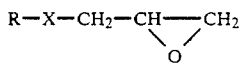  (2)

(wherein R is a hydrocarbon group of 2–18 carbon atoms which has an ethylenically unsaturated bond and X is —CH$_2$—O— or

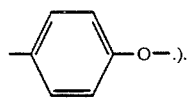

Typical examples of unsaturated epoxy compounds are glycidyl acrylate, glycidyl methacrylate, glycidyl itaconate, allylglycidyl ether, 2-methylallylglycidyl ether and styrene-p-glycidyl ether.

Furthermore, ter- or more copolymers of unsaturated epoxy compounds and ethylene and ethylenically unsaturated compounds may also be used as the epoxy group-containing ethylene copolymer. As the ethylenically unsaturated compounds, mention may be made of α, β-unsaturated carboxylic acid alkyl esters, carboxylic acid vinyl esters, olefins, vinyl ethers and styrenes.

Preferred epoxy group-containing ethylene copolymers include those which comprise 30–99% by weight of ethylene unit (a), 20–1% by weight of α, β-unsaturated carboxylic acid glycidyl ester unit (b) and 70–0% by weight of ester unit (c) selected from vinyl carboxylate unit and α, β-unsaturated carboxylic acid alkyl ester unit. Among them, preferred are, for example, copolymers comprising ethylene unit and glycidyl methacrylate unit, copolymers comprising ethylene unit, glycidyl methacrylate unit and methyl acrylate unit and copolymers comprising ethylene unit, glycidyl methacrylate unit and vinyl acetate unit.

This epoxy group-containing ethylene copolymer has a melt index (JIS K6760) of 0.5–100 g/10 min. When the melt index is more than 100 g/10 min., mechanical properties of the resulting composition are not sufficient and when less than 0.5 g/10 min., the copolymer lacks compatibility with saturated polyester resin.

The epoxy group-containing ethylene copolymer may be produced by various methods, for example, random copolymerization where unsaturated epoxy compound is introduced into the main chain of the copolymer and graft copolymerization where unsaturated epoxy compound is introduced as a side chain of the copolymer. Specific methods for preparation include copolymerizing unsaturated epoxy compound and ethylene at 100°–300° C. and under 500–4000 atm in the presence of a radical forming agent and in the presence or absence of a suitable solvent or chain transfer agent or mixing polyethylene with unsaturated epoxy compound and a radical forming agent and melt-graft copolymerizing the polyethylene with the unsaturated epoxy compound in an extruder.

The component (C) used in the present invention, namely, polyfunctional compound which contain in one molecule at least two functional groups having reactivity with epoxy group, carboxyl group or hydroxyl group has no special limitations as far as it has intermolecular cross-linking reactivity with epoxy group-containing ethylene copolymer (B) or saturated polyester resin (A). Typical examples are shown below.

As examples of the polyfunctional compounds component (C) mention may be made of compounds containing in one molecule at least two functional groups selected from amino group, epoxy group, dihydroxazolyl group, carboxylic anhydride group, carboxyl group and hydroxyl group.

These polyfunctional compounds (C) have no special limitation in molecular weight and also include high molecular compounds.

Typical examples having at least two amino groups in one molecule are as follows:

Aliphatic diamines such as 1,6-hexamethylenediamine, trimethylhexamethylenediamine, 1,4-diaminobutane, 1,3-diaminopropane, ethylenediamine and polyether diamine, aliphatic diamine carbamates such as hexamethylenediamine carbamate and ethylenediamine carbamate, aliphatic polyamines such as diethylenetriamine, triethylenetetramine, tetraethylenepentamine, pentaethylenehexamine, ethylaminoethylamine, methylaminopropylamine, 2-hydroxyethylaminopropylamine, aminoethylethanolamine, 1,3-bis(3-aminopropoxy)-2,2-dimethylpropane, 1,3,6-trisaminomethylhexane, iminobispropylamine, methyliminobispropylamine and bis(hexamethylene)triamine, alicyclic polyamines such as menthanediamine, N-aminoethylpiperazine, 1,3-diaminocyclohexane, isophoronediamine and bis(4-amino-3-methylcyclohexyl)methane, aliphatic polyamines having aromatic ring such as m-xylylenediamine and tetrachloro-p-xylylenediamine, aromatic amines such as m-phenylenediamine, diaminodiphenyl ether, 4,4'-methylenedianiline, diaminodiphenyl sulfone, benzidine, 4,4'-bis(o-toluidine), 4,4'-thiodianiline, o-phenylenediamine, dianisidine, methylenebis(o-chloroaniline), 2,4-toluenediamine, bis(3,4-diaminophenyl)sulfone, diaminoditolyl sulfone, 4-chloro-o-phenylenediamine, 4-methoxy-6-methyl-m-phenylenediamine and m-aminobenzylamine, polyamines containing silicon such as 1,3-bis(γ-aminopropyl)-1,1,3,3-tetramethyldisiloxane, amine-modified silicone oil, butadiene-acrylonitrile copolymers having a terminal functional group of amine, tertiary amine compounds such as N,N,N', N'-tetramethylhexamethylenediamine and N,N,N',N'',N''- pentamethyldiethylenetriamine, ethylene copolymers comprising ethylene unit and α, β-unsaturated carboxylic acid N,N-dialkylaminoalkyl ester unit such as copolymer of ethylene and N,N-dimethylaminoethyl methacrylate, ethylene copolymers comprising ethylene unit and N,N-dialkylaminoalkyl α, β-unsaturated carboxylic acid amide unit such as copolymer of ethylene and N,N-dimethylaminopropylacrylamide, dihydrazide compounds such as succinic acid dihydrazide, adipic acid dihydrazide, isophthalic acid dihydrazide and eicosanediacid dihydrazide, diaminomaleonitrile and melamine. Furthermore, epoxy resin curing agents such as 2,4,6-tris(dimethylaminomethyl)phenol and imidazoles e.g., 2-ethyl-4-methylimidazole may also be used.

Compounds containing at least two carboxylic acid anhydride group in one molecule include ethylene copolymers comprising ethylene unit and maleic anhydride unit, copolymers of isobutylene and maleic anhydride and copolymers of styrene and maleic anhydride. These copolymers may additionally contain α,β-unsaturated carboxylic acid alkyl esters or carboxylic acid vinyl esters as copolymer component. Examples of such additional components are alkyl esters of acrylic acid or methacrylic acid such as methyl acrylate, ethyl acrylate, butyl acrylate, methyl methacrylate, ethyl methacrylate and butyl methacrylate, vinyl acetate and vinyl propionate. Further examples are trimellitic anhydride, pyromellitic anhydride and ethylene glycol bis-(anhydrotrimellitate).

Typical examples of compounds containing at least two epoxy groups in one molecule are enumerated below.

They may be roughly classified into olefin copolymers and epoxy compounds.

Copolymers of olefins and glycidyl methacrylate and/or glycidyl acrylate may be used as the olefin copolymers. The olefins include, for example, ethylene, propylene, butene-1 and isobutylene, among which ethylene is especially preferred. The olefin copolymers may additionally contain $\alpha,\beta$-unsaturated carboxylic acid alkyl esters and carboxylic acid vinyl esters as copolymer component. Examples are alkylesters of acrylic acid and methacrylic acid such as, for example, methyl acrylate, ethyl acrylate, n-butyl acrylate, methyl methacrylate, vinyl acetate and vinyl propionate. Furthermore, glycidyl methacrylate modified ethylenepropylene rubber and ethylene-methyl acrylate-glycidyl methacrylate copolymer rubber may also be used.

Polymerization method for preparation of the olefin copolymers may be any of random copolymerization, block copolymerization and graft copolymerization. Content of glycidyl methacrylate and/or glycidyl acrylate in the olefin copolymers may be 5-50% by weight and if the content is outside this range the effects of improvement of properties according to the present invention is insufficient.

As the epoxy compounds, mention may be made of, for example, glycidyl ethers of bisphenols such as bisphenol A, resorcinol and hydroquinone and halides of these bisphenols. Especially suitable are epoxy resins.

These epoxy compounds may be used alone or in combination.

Generally, epoxy compounds are used together with curing agents such as amines, acid anhydrides, polymercaptan and phenolic resins. In the present invention, normally, the curing agents are not used, but may be used as far as amount of their active hydrogen is equal to or less than that of epoxy group in molar ratio.

As the epoxy resins, mention may be made of, for example, bisphenol A epoxy resins, bisphenol F epoxy resins, novolak epoxy resins, alicyclic epoxy resins, glycidyl ester resins, glycidylamine resins, hydantoin epoxy resins and triglycidyl isocyanurate.

Compounds containing at least two dihydroxazolyl groups in one molecule include, for example, 2,2'-(1,3-phenylene)-bis(2-oxazoline) and copolymer of styrene and vinyloxazoline.

Compounds containing at least two carboxyl groups or hydroxyl groups include, for example, terephthalic acid, isophthalic acid, adipic acid, sebacic acid, dodecanoic dibasic acid, copolymer of ethylene and acrylic acid, saponification product of copolymer of ethylene and vinyl acetate and cyanuric acid.

The thermoplastic resin composition of the present invention contains 60-97 parts by weight, preferably 70-90 parts by weight of saturated polyester resin component (A) and 40-3 parts by weight, preferably 30-10 parts by weight of epoxy group-containing ethylene copolymer component (B). When amount of saturated polyester resin component (A) is less than 60 parts by weight, stiffness and heat resistance of the composition are not sufficient and when more than 97 parts by weight, no preferable results are obtained in impact resistance.

In the present invention, amount of the polyfunctional compound component (C) which must be adjusted depending on reactivity of the polyfunctional compound with epoxy group, carboxy group or hydroxyl group is 0.01-20 parts by weight for 100 parts by weight of the saturated polyester resin component (A) and the epoxy group-containing ethylene copolymer component (B) in total. When the amount of (C) is less than 0.01 part by weight, the effects of improvement in mechanical properties such as impact resistance are insufficient and when more than 20 parts by weight, effect of increment of amount is not recognized.

The method for production of the thermoplastic resin composition of the present invention is to knead the components in molten state.

The method comprises melt-kneading saturated polyester resin component (A) and epoxy group-containing ethylene copolymer component (B) and, at the subsequent state, adding to the resulting composition polyfunctional compound component (C) and melt-kneading them to carry out partial crosslinking reaction.

The reason why the addition and melt-kneading of the polyfunctional compound component (C) results in remarkable improvement of properties is considered that micro-dispersion state of polymer having good properties is produced by proper crosslinking.

In general, improvement of impact resistance tends to cause reduction of stiffness and deterioration of heat distortion resistance. On the contrast, in the composition obtained by the method of the present invention, impact resistance can be improved without deterioration of other properties. This is an unexpected effect of improvement.

The melt-kneading can be carried out by generally employed kneading apparatuses such as single- or twin-screw extruders and other various extruders, Banbury mixer, rolls and various kneaders.

Addition and melt-kneading of the component (C) of polyfunctional compound can be performed, for example, by once producing a melt kneaded and granulated composition of saturated polyester resin component (A) and epoxy group-containing ethylene copolymer component (B) by an extruder and then adding the polyfunctional compound, component (C), to the composition and again melt-kneading the composition by an extruder. Preferably, an extruder with a side feed device is used and at the former stage (feeding side), a melt-kneaded composition of saturated polyester resin component (A) and epoxy group-containing ethylene copolymer (B) is produced and at the latter stage (extrusion side) of the same extruder, solid or molten polyfunctional compound, component (C), is added to the composition by the side feed device and melt-kneaded.

Alternatively, it is also a preferable method to previously produce a masterbatch by melt-kneading the polyfunctional compound, component (C), and a resin which is inert to the component (C) and add this masterbatch in a suitable amount at the production of the thermoplastic resin composition.

Preferably, before kneading, the resin components in the form of powder or pellet are homogeneously mixed by an apparatus such as tumbler or Henschel mixer, but if necessary, the components may be separately fed in a given amount to a kneading apparatus without said previous mixing.

The resin composition of the present invention may further contain, as far as its processability and properties are not damaged, other components such as, for example, pigment, dye, reinforcing agent, filler, heat stabilizer, antioxidant, weathering agent, nucleating. agent, lubricant, antistatic agent, fire retardant, plasticizer and other polymers.

Especially when reinforcing agents or fillers such as surface-treated glass fiber, carbon fiber, talc and calcium carbonate are added to the resin composition of the present invention, very useful materials high in both the stiffness and impact resistance can be obtained.

The kneaded resin composition of the present invention is molded by various methods such as injection molding, extrusion molding and the like.

The present invention will be further illustrated by the following examples.

In the examples, modulus in bending (thickness of sample: 3.2 mm; measuring temperature: 23° C.), Izod impact strength (thickness of sample: 3.2 mm; temperature: 23° C. and −40° C.; with V-notch), heat distortion temperature (thickness of sample: 3.2 mm; bending stress: 4.6 kgf/cm$^2$) and melt index (190° C., 2160 g) were measured in accordance with JIS K7203, JIS K7110, JIS K7207 and JIS K6760, respectively.

In the examples and comparative examples, the following were used as saturated polyester resin, component (A), epoxy group-containing ethylene copolymer, component (B) and polyfunctional compound, component (C).

(A) Saturated polyester resins (1) Polybutylene terephthalate (PBT): TUFPET PBT ® N1000 (Mitsubishi Rayon Co., Ltd.)

(2) Polyethylene terephthalate (PET): DIANITE ® MA500 (Mitsubishi Rayon Co., Ltd.)

(B) Epoxy group-containing ethylene copolymer

Copolymers prepared by high-pressure radical copolymerization were used.

(1) Copolymer (1)
E/GMA=94/6% by weight, MI=3 g/10 min.

(2) Copolymer (2)
E/GMA/MA=83/12/5% by weight, MI=3 g/10 min.

(3) Copolymer (3)
E/GMA/MA=47/8/45% by weight, MI=17 g/10 min.

(C) Polyfunctional compounds (1) Compound (1)
E/EA/MAH=66.8/32.0/1.2% by weight, MI=7 g/10 min. (Ethylene copolymer prepared by the methods disclosed in French Patent No.1,323,379 and French Patent Application No.81/01,430)

(2) Compound (2)
An ethylene copolymer of E/DAM=72/28% by weight and MI=100 g/10 min. prepared by high-pressure radical copolymerization.

(3) MB-1
A masterbatch prepared by melt-kneading 2 parts by weight of hexamethylenediamine carbamate and 98 parts by weight of ACRYFT ® CM4008 (Sumitomo Chemical Co., Ltd.) at 200° C. by a 30 mmφ single-screw extruder with a vent. (ACRYET ® CM4008 is an ethylene copolymer of E/MMA=81/19% by weight and MI=7 g/10 min. prepared by high-pressure radical copolymerization)

(4) MB-2
A masterbatch prepared by melt-kneading 5 parts by weight of 2,2′-(1,3-phenylene)-b (2-oxazoline) and 95 parts by weight of ACRYFT ® CM4008 (Sumitomo Chemical Co., Ltd.) at 200° C. by a 30 mmφ single-screw extruder with a vent.

(5) Compound (3)
An ethylene copolymer of E/DAM=85/15% by weight and MI=15 g/10 min. prepared by high-pressure radical copolymerization.

In the above, the abbreviations stand for the following:

E: Ethylene; GMA: Glycidyl methacrylate; MA: Methyl acrylate; EA: Ethyl acrylate; MAH: Maleic anhydride; DAM: dimethylaminoethyl methacrylate; MMA: Methyl methacrylate; and MI: Melt index.

EXAMPLES 1-5 and 7

Saturated polyester resin and epoxy group-containing ethylene copolymer as shown in Table 1 were melt-kneaded at a given temperature (230° C. for PBT and 270° C. for PET) by a 30 mmφ single-screw extruder with a vent to obtain a resin compositions.

To these compositions were added polyfunctional compound shown in Table 1 and each of the mixtures was melt-kneaded at a given temperature (230° C. for PBT and 270° C. for PET) by the same 30 mmφ single-screw extruder with a vent to obtain resin compositions.

Each of the resin compositions was dried at 120° C. for 3 hours and therefrom a test piece for measurement of properties was prepared by a 10 oz injection molding machine (TOSHIBA IS-150 E-V) at a given temperature (250° C. for PBT and 290° C. for PET) and at a given mold temperature (80° C. for PBT and 130° C. for PET).

Modulus in bending, Izod impact strength and heat distortion temperature of the test pieces are shown in Table 1.

COMPARATIVE EXAMPLES 1 and 8

Saturated polyester resin, epoxy group-containing ethylene copolymer and polyfunctional compound as shown in Table 1 were melt-kneaded at one stage at a given temperature (230° C. for PBT and 270° C. for PET) by a 30 mmφ single-screw extruder with a vent to obtain resin compositions. Each resin composition was evaluated in the same manner as in Example 1 and the results are shown in Table 1 They were inferior in Izod impact strength.

COMPARATIVE EXAMPLES 2, 5 and 9

Saturated polyester resin and epoxy group-containing ethylene copolymer as shown in Table 1 were melt kneaded at a given temperature (230° C. for PBT and 270° C. for PET) by a 30 mmφ single-screw extruder with a vent to obtain resin compositions.

These resin compositions were evaluated in the same manner as in Example 1 and the results are shown in Table 1. The compositions showed less improvement in Izod impact strength as compared with those in Examples 1, 3 and 7. They were also inferior in heat distortion resistance (heat distortion temperature) to those of Examples 1, 3 and 7.

COMPARATIVE EXAMPLES 3 and 4

Saturated polyester resin and polyfunctional compound as shown in Table 1 were melt-kneaded at 230° C. by a 30 mmφ single-screw extruder with a vent to obtain resin compositions. These compositions were evaluated in the same manner as in Example 1 and the results are shown in Table 1. They were inferior in Izod impact strength.

COMPARATIVE EXAMPLE 6

Saturated polyester resin and epoxy group-containing ethylene copolymer as shown in Table 1 were melt-kneaded at 230° C. by a 30 mmφ single-screw extruder with a vent to obtain a resin composition. To this resin composition was added ACRYFTφ CM4008 and the mixture was melt-kneaded at 230° C. by the same 30 mmφ extruder with a vent to obtain a resin composition. This composition was evaluated in the same manner as in Example 1 and the results are shown in Table 1. This was inferior in Izod impact resistance.

EXAMPLE 6 and 8

Saturated polyester resin and epoxy group-containing ethylene copolymer as shown in Table 1 were melt-kneaded at 230° C. by a 44 mmφ twin-screw extruder having a side feed and a vent during which polyfunctional compound as shown in Table 1 was added in a constant amount from the side feed provided halfway of barrel of the extruder and melt-kneaded to obtain resin compositions. These resin compositions were evaluated in the same manner as in Example 1 and the results are shown in Table 1.

COMPARATIVE EXAMPLES 7 AND 10

Properties of each of PBT-base resin and PET-base resin used in the above examples were evaluated and the results are shown in Table 1.

As explained above, the thermoplastic resin composition obtained by the method of the present invention provides very good balance in properties of molded articles such as mechanical properties and thermal properties and besides provides molded articles of good appearance.

Especially, addition of the polyfunctional compound can improve impact resistance and heat distortion resistance without damaging other properties. This is an unexpectable effect.

The novel resin composition provided by the present invention can be easily processed into molded articles, films and sheets by processing methods ordinarily used for saturated polyester thermoplastic resin compositions such as injection molding and extrusion molding and the thus obtained articles are extremely good in balance of properties such as impact resistance, stiffness and heat resistance and have superior appearance and surface-smoothness.

TABLE 1

| | Saturated polyester resin (Part by weight) | Epoxy group-containing ethylene copolymer (Part by weight) | Polyfunctional compound (Part by weight) | Kneading method | Modulus in bending 23° C. (kg/cm²) | Izod impact strength (kg·cm/cm) 23° C. | Izod impact strength (kg·cm/cm) −40° C. | Heat distortion temperature 4.6 kg/cm² (°C.) |
|---|---|---|---|---|---|---|---|---|
| Example 1 | PBT 80 | Copolymer (1) 15 | Compound (1) 5 | 2 steps | 17200 | 57 | 9 | 143 |
| Comparative Example 1 | PBT 80 | Copolymer (1) 15 | Compound (1) 5 | 1 step | 17100 | 6 | 5 | 135 |
| Example 2 | PBT 80 | Copolymer (1) 15 | Compound (2) 5 | 2 steps | 16900 | NB* | 10 | 145 |
| Comparative Example 2 | PBT 80 | Copolymer (1) 20 | — | 1 step | 17200 | 20 | 5 | 136 |
| Comparative Example 3 | PBT 80 | — | Compound (1) 20 | 1 step | 18300 | 11 | 6 | 119 |
| Comparative Example 4 | PBT 80 | — | Compound (2) 20 | 1 step | 16500 | 8 | 5 | 114 |
| Example 3 | PBT 80 | Compolymer (2) 15 | Compound (2) 5 | 2 steps | 16600 | NB* | 12 | 138 |
| Comparative Example 5 | PBT 80 | Copolymer (2) 20 | — | 1 step | 16800 | 24 | 6 | 124 |
| Example 4 | PBT 80 | Copolymer (1) 15 | MB-1 5 | 2 steps | 17000 | 55 | 8 | 143 |
| Example 5 | PBT 80 | Copolymer (1) 15 | MB-2 5 | 2 steps | 16900 | 45 | 7 | 141 |
| Comparative Example 6 | PBT 80 | Copolymer (1) 15 | ACRYFT ® CM 4008 5 | 2 steps | 16300 | 22 | 6 | 133 |
| Example 6 | PBT 80 | Copolymer (1) 15 | Compound (2) 5 | 2 steps | 17000 | NB* | 11 | 146 |
| Comparative Example 7 | PBT 100 | — | — | — | 26400 | 5 | 4 | 150 |
| Example 7 | PET 80 | Copolymer (1) 15 | Compound (2) 5 | 2 steps | 14800 | 32 | 6 | 63 |
| Comparative Example 8 | PET 80 | Copolymer (1) 15 | Compound (2) 5 | 1 step | 14700 | 8 | 5 | 60 |
| Comparative Example 9 | PET 80 | Copolymer (1) 20 | — | 1 step | 15000 | 7 | 4 | 60 |
| Comparative Example 10 | PET 100 | — | — | — | 23000 | 3 | 2 | 69 |
| Example 8 | PBT 80 | Copolymer (3) 15 | Compound (3) 5 | 2 steps | 16900 | NB* | 20 | 145 |

*NB: Not broken

We claim:
1. A method for producing a thermoplastic resin composition which comprises:

melt-kneading (A) 60–97 parts by weight of polybutylene terephthalate and (B) 40–3 parts by weight of an epoxy group-containing ethylene copolymer consisting essentially of:

(a) 30–99% by weight of ethylene units, (b) 20–1% by weight of α,β-unsaturated carboxylic acid glycidyl ester units, and (c) 70–0% by weight of ester unit selected from carboxylic acid vinyl ester unit and α,β-unsaturated carboxylic acid alkyl ester unit, wherein (B) is prepared by copolymerizing (a), (b) and (c) at 100°–300° C. under 500–400 atm in the presence of a radical forming agent, and then melt-kneading the resulting composition with (C) 0.01–20 parts by weight of 2,2'-(1,3-phenylene)-bis(2-oxazoline) to carry out a partial crosslinking reaction.

* * * * *